US012655917B2

(12) United States Patent
Decker et al.

(10) Patent No.: US 12,655,917 B2
(45) Date of Patent: Jun. 16, 2026

(54) VALVE ASSEMBLIES INCLUDING A SEALED HOUSING AND RELATED SYSTEMS AND METHODS

(71) Applicant: Flowserve Pte Ltd., Singapore (SG)

(72) Inventors: Gifford Decker, Springville, UT (US); Varadharajen Lakshamanan, Bangalore (IN); Fred Cain, Orem, UT (US)

(73) Assignee: FLOWSERVE PTE. LTD., Singapore (SG)

( * ) Notice: Subject to any disclaimer, the term of this patent is extended or adjusted under 35 U.S.C. 154(b) by 362 days.

(21) Appl. No.: 17/334,169

(22) Filed: May 28, 2021

(65) Prior Publication Data

US 2021/0285562 A1 Sep. 16, 2021

Related U.S. Application Data

(63) Continuation of application No. 13/279,103, filed on Oct. 21, 2011, now Pat. No. 11,047,498.

(60) Provisional application No. 61/406,090, filed on Oct. 22, 2010.

(51) Int. Cl.
*F16K 31/04* (2006.01)
*F16K 31/08* (2006.01)

(52) U.S. Cl.
CPC ............. *F16K 31/04* (2013.01); *F16K 31/088* (2013.01)

(58) Field of Classification Search
CPC ........ F16K 31/04; F16K 31/088; F16K 31/06; F16K 31/08; F16K 31/082; F16K 31/0655; H01F 7/0231; H01F 7/0242

USPC .............. 335/306, 302; 310/154.32, 156.11, 310/156.01, 156.09
See application file for complete search history.

(56) References Cited

U.S. PATENT DOCUMENTS

| | | | | |
|---|---|---|---|---|
| 3,347,262 A ‡ | 10/1967 | Gibson | ................. | F16K 31/088 |
| | | | | 137/375 |
| 3,908,959 A ‡ | 9/1975 | Fichtner | ................ | F16K 31/048 |
| | | | | 251/129.11 |
| 4,327,892 A ‡ | 5/1982 | Ruyak | ................... | F16K 31/088 |
| | | | | 251/65 |
| 4,384,703 A ‡ | 5/1983 | Ruyak | ................... | F16K 31/088 |
| | | | | 251/65 |
| 4,671,486 A ‡ | 6/1987 | Giannini | ............... | F16K 31/088 |
| | | | | 251/65 |
| 5,364,066 A ‡ | 11/1994 | Dorste | ................... | F25B 41/31 |
| | | | | 251/122 |
| 5,372,351 A ‡ | 12/1994 | Oliver | ................... | F16K 31/055 |
| | | | | 251/65 |

(Continued)

FOREIGN PATENT DOCUMENTS

| | | | | |
|---|---|---|---|---|
| GB | 2457226 A ‡ | 8/2009 | ........... | H02K 49/102 |

*Primary Examiner* — Craig M Schneider
*Assistant Examiner* — Andrew J Rost
(74) *Attorney, Agent, or Firm* — BKRIP LLC

(57) ABSTRACT

Valve assemblies include a first actuation element coupled to the valve member, where the first actuation element is configured to move the valve member between a first closed position and a second open position. An inner housing encloses the first actuation element and is statically sealed to a valve body. A second actuation element is configured to be coupled to a valve actuator for moving the second actuation element relative to the first actuation element, where movement of the second actuation element is configured to indirectly apply a force to the first actuation element through the inner housing.

20 Claims, 3 Drawing Sheets

(56)                    References Cited

U.S. PATENT DOCUMENTS

| 5,611,368 | A ‡ | 3/1997 | Hwang et al. | ........... | F16J 15/50 |
| | | | | | 137/553 |
| 6,997,430 | B2 ‡ | 2/2006 | Denning | .............. | F16K 31/047 |
| | | | | | 251/71 |
| 8,297,315 | B2 ‡ | 10/2012 | Esveldt | ..................... | F16K 1/12 |
| | | | | | 137/625.3 |
| 2005/0206260 | A1 ‡ | 9/2005 | Akiyama | ................ | C30B 15/30 |
| | | | | | 310/104 |
| 2008/0073606 | A1 ‡ | 3/2008 | Liantonio | ............. | F16K 31/086 |
| | | | | | 251/65 |
| 2008/0157014 | A1 ‡ | 7/2008 | Vick, Jr. et al. | ...... | F16K 31/086 |
| | | | | | 251/65 |

‡ imported from a related application

VALVE ASSEMBLIES INCLUDING A SEALED HOUSING AND RELATED SYSTEMS AND METHODS

CROSS-REFERENCE TO RELATED APPLICATIONS

This application is a continuation of U.S. patent application Ser. No. 13/279,103, filed Oct. 21, 2011, which application claims the benefit of U.S. Provisional Patent Application Ser. No. 61/406,090, filed Oct. 22, 2010, the disclosure of each of which is hereby incorporated herein in its entirety by this reference.

TECHNICAL FIELD

The present disclosure relates generally to control valves. More particularly, embodiments of the present disclosure relate to control valves comprising substantially a seal-less and/or leak-free control valve.

BACKGROUND

Typical control valves require a dynamic seal between the fluid containment area and the outside atmosphere (e.g., a seal the area between the fluid flow path and the chamber on the top of a plug head). In many applications, the seals that are generally used expand and shrink at a rate many times that of the metal parts around it. As a result, the seal will leak when the plug is on the seat (valve is shut), during the dynamic action of the valve, and during operation. Some applications require leakage levels to be very low when the valve is shut. Outer diameter seals by themselves are not capable of getting very low levels of leakage.

In the oil and gas industry, the concentration of $H_2S$ in hydrocarbons is increasing significantly with the shift to the production of more 'difficult' oil and gas fields. Inherently leak-free valves, which are not yet available to the oil and gas industry, are needed for the safer and more efficient production of sour oil and gas.

A main trend in the industry is the exploitation of more challenging fields with high $H_2S$ concentrations and high pressures. The current world reserves of sour gas are estimated at 4400 Tscf, of which 50% contain more than 15% contaminants. An example of an extremely sour field will operate with pressures up to 800 bar and having a starting $H_2S$ concentration of about 20%. Additionally, the worldwide implementation of tighter regulations, including penalties related to fugitive emissions, creates regulatory demands. It is estimated that about two thirds of the fugitive emissions originates from valves. Thus, exploration operations would benefit greatly by the availability of leak-free valve technology.

SUMMARY

The present disclosure includes embodiments that resolve many of the issues found in the art of control valve design. Specifically, embodiments are described for valve controls and valve assemblies that reduce fugitive emissions and lessen leakage levels. Generally, the embodiments described herein include a method, system, and apparatus for a valve assembly.

In one embodiment, the valve assembly includes a valve body; an outer housing having rotating shaft containing magnets, wherein the outside housing is driven by a motor; an inner housing statically sealed to the valve body; an actuation system enclosed within the inner housing, the actuation system having magnets that are induced by magnetic field created by the rotating shaft magnets.

In further embodiments, the valve body may include a sliding stem. In another embodiment, the valve body may include a rotary stem. In one embodiment, the valve body comprises an integrated, statically sealed bonnet and a stem coupler. In a further embodiment, the actuation system comprises a rotary-to-linear device. In yet a further embodiment, the actuation system comprises a rotary device.

In one embodiment, the valve assembly comprises a control valve, on-off valve, or rotary valve assembly. In one embodiment, the rotating shaft of the outer housing is in contact with a motor. In a further embodiment, a gear box is disposed between the rotating shaft and the motor. In one embodiment, the rotating shaft includes an outer magnetic rotor. In a further embodiment, the outer magnetic rotor comprises a solid rotor, or a radial disc connected to a ring-shaped outer magnetic rotor ring. In a further embodiment, the at least one outer magnet comprises a plurality of evenly circumferentially-spaced individual magnet elements. In yet a further embodiment, the at least one outer magnet is located on the inside face of the outer rotor.

In one embodiment, the at least one inner magnet is disposed within an alloy housing. In another embodiment, the at least one inner magnet comprises a plurality of evenly circumferentially spaced individual magnet elements. In some embodiments, the at least one inner magnet faces the outer magnet. In some embodiments, the valve assembly includes a valve closure element in communication with the actuation system.

In a certain embodiment, the valve assembly includes a valve body; an outer housing having rotating shaft containing at least one outer magnet, wherein the outside housing is driven by a motor; an inner housing statically sealed to the valve body; an actuation system enclosed within the inner housing, the actuation system having at least one inner magnet that is induced by magnetic field created by the rotating shaft magnets; and a gear box disposed between the rotating shaft and the motor.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

These features and advantages of the present disclosure will become more fully apparent from the following description and appended claims, or may be learned by the practice of the disclosure as set forth hereinafter.

DETAILED DESCRIPTION

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

In the following detailed description, reference is made to the accompanying drawings, which form a part hereof, and in which is shown, by way of illustration, specific embodiments in which the disclosure may be practiced. These embodiments are described in sufficient detail to enable a person of ordinary skill in the art to practice the disclosure. However, other embodiments may be utilized, and structural, logical, and electrical changes may be made without departing from the scope of the disclosure. The illustrations presented herein are not meant to be actual views of any particular device or system, but are merely idealized representations that are employed to describe embodiments of the present disclosure. The drawings presented herein are not necessarily drawn to scale. Additionally, elements common between drawings may retain the same or have similar numerical designations.

The illustrations presented herein are, in some instances, not actual views of any particular cutting element insert, cutting element, or drill bit, but are merely idealized representations which are employed to describe the present disclosure. Additionally, elements common between figures may retain the same numerical designation.

As used herein, "leak-free valve" or "seal-less valve" means a valve with no dynamically loaded seals towards the external environment. A seal-less valve throttles or switches a fluid flow like any other valve would, but is characterized in having zero potential leak paths to the outside atmosphere, by design and by concept. Potential leak path elimination dictates that sliding or rotating seals (dynamically loaded seals) between the fluid containment area and the outside atmosphere are to be eliminated.

A particular embodiment of the present disclosure includes a rotating armature that is completely sealed and separated from operating fluid by packing is driven with magnetic force. The application includes operation of the armature in a manner that is non-continuous as is the mixer and pump operation. With regard to control valves, the operation must be able to reverse and position for control and provide sufficient linear force to enable valve shut-off.

Figure 1:
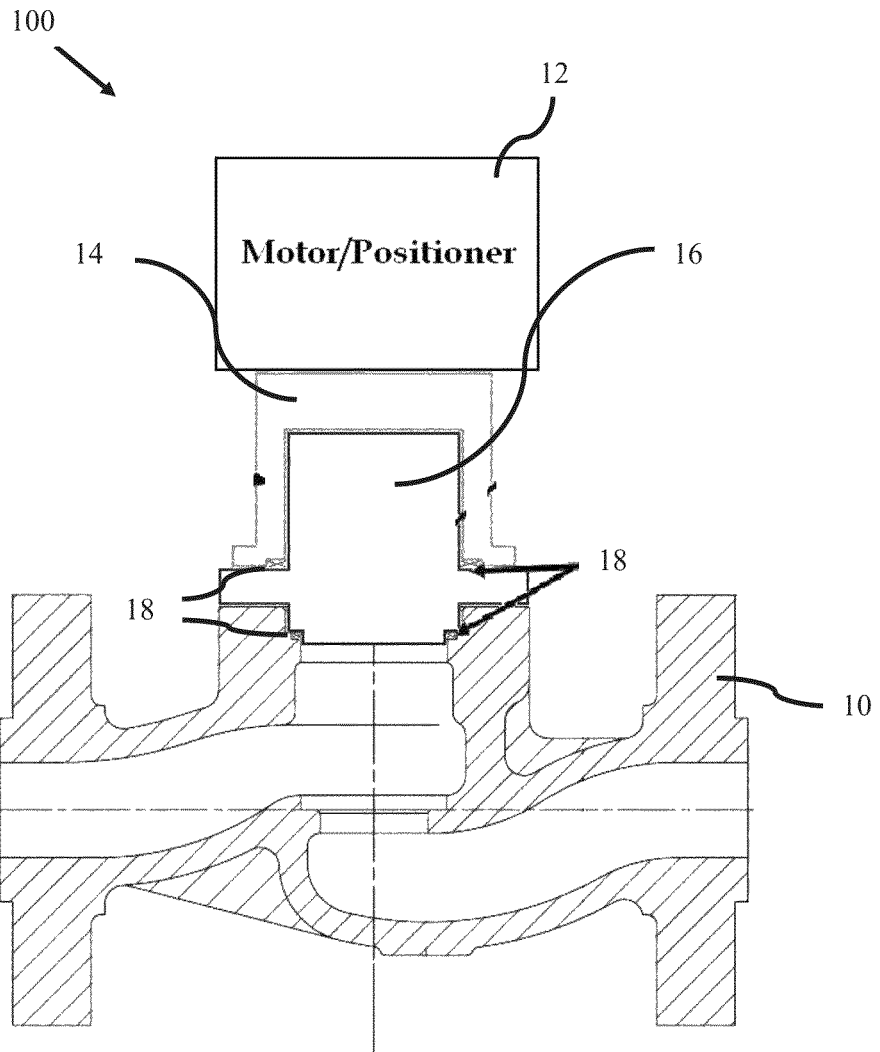
FIG. 1 illustrates a cross-section of a valve assembly according to at least one embodiment.

Referring to FIG. 1, an embodiment of a valve assembly 100 in accordance with the present disclosure includes a control valve body 10 with either sliding stem or rotary stem) having an integrated, statically sealed bonnet and stem coupler, and magnetic drive technology. A motor/positioned 12 may be included that is attached to the drive system 14. The drive system 14 is completely isolated from the containment system 16. The containment system 16 includes a valve closure element (e.g., a plug) and rotary or linear actuation system as discussed below. In particular embodiments, position feedback and diagnostics may require one sealed penetration for communication. In the depicted embodiment static seals 18 are providing between the drive system 14 and the containment system 16, and between the containment system 16 and the valve body 10. In one embodiment, a magnetic force is generated by the drive system 14 and passed electromagnetically to the containment system 16 to actuate a valve plug 30 (FIG. 2).

Figure 2:
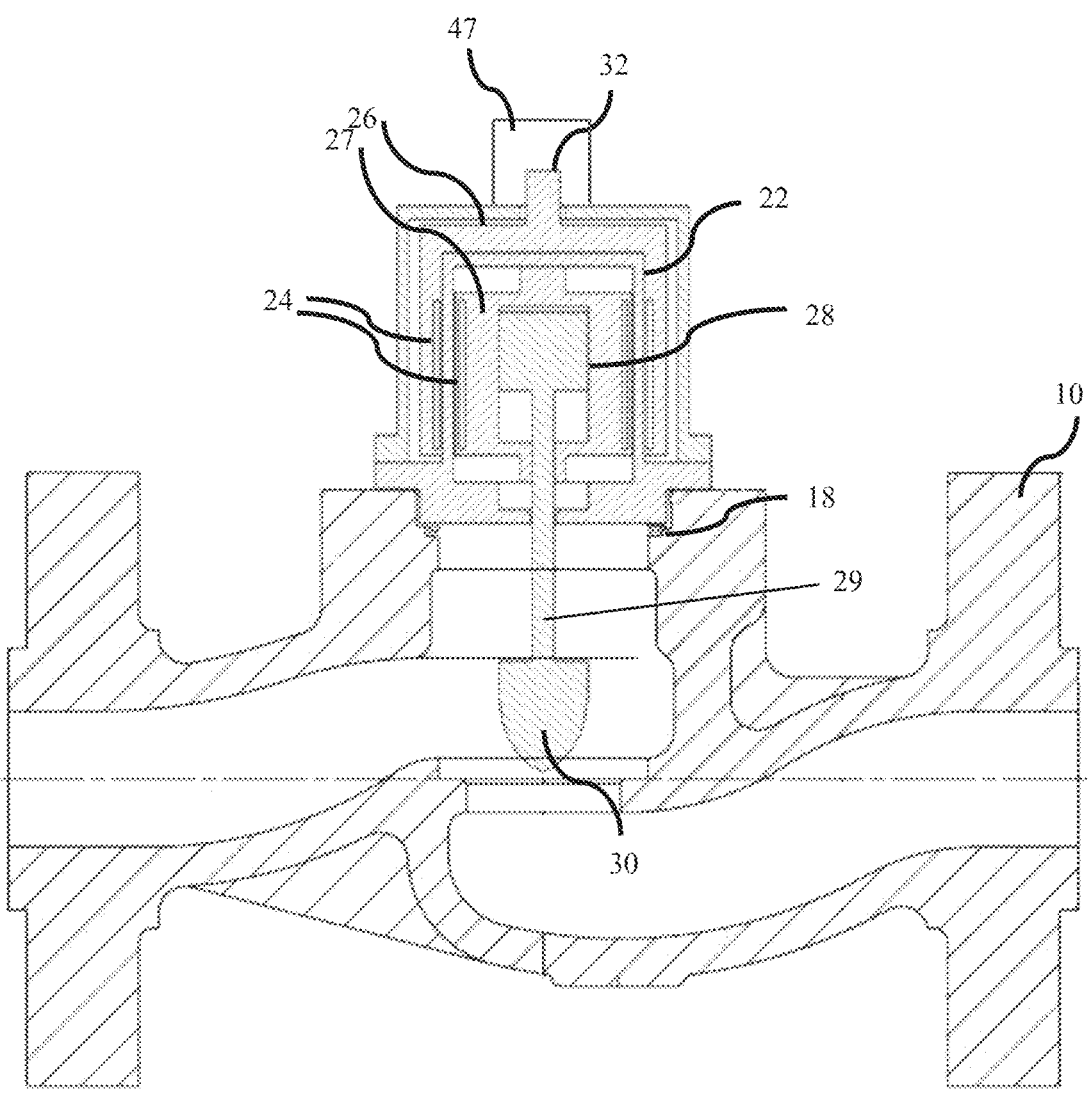
FIG. 2 illustrates a magnified cross-section view of a valve assembly according to at least one embodiment, showing details of the alloy housing and enclosure components.
Figure 3:
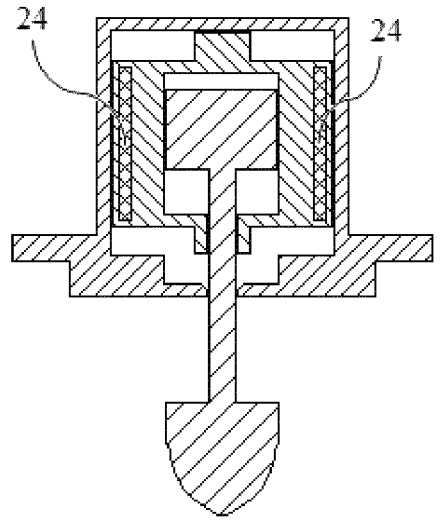
FIG. 3 illustrates a cross-section of the alloy housing according to an embodiment.
Figure 4:
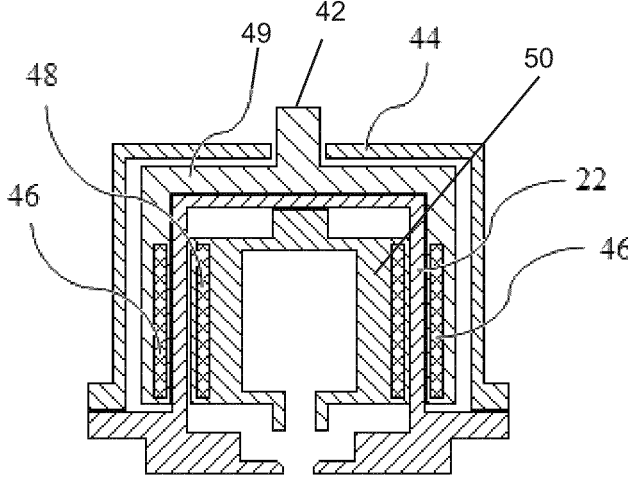
FIG. 4 illustrates a cross-section of the housing according to an embodiment.

Referring to FIGS. 2 and 3, actuation is completely enclosed in an alloy housing 22 that is statically sealed to the valve body 10 using a static seal 18 (e.g., via a gasket o-ring). The actuation components can include a rotary-to-linear device 28 (e.g., a rotating outer screw that drives a screw attached to a plug to create linear motion) or a rotary device, bearings, packing, and, optionally, potting fluid to protect the actuation components. The rotary motion is induced by magnetic field created by similar magnets 24 rotating outside the housing 22 (e.g., through an outer magnetic rotor 26), as also illustrated in FIG. 4. For example, one or more magnets 24 may be housed in the alloy housing 22 and one or more magnets 24 may be housed outside the alloy housing 22. Magnetic energy may be passed from magnets 24 outside the alloy housing 22 to magnets 24 inside the alloy housing 22 to drive a rotating member. In at least one embodiment, a rotating part 26 may be included outside the alloy housing 22 and a corresponding rotating part 26 may be included inside the alloy housing 22. As the external rotating part 26 rotates, energy may be transferred magnetically to cause the internal rotating part 26 to rotate. In this manner the valve may be operated using only static seals 18 to separate the interior liquid flow from external rotating parts 26. In at least one embodiment, a shaft 32 may be provided for attachment to a motor 12.

It is understood that the present disclosure can be applied to numerous valve systems, such as control valves, on-off valves, rotary valves, etc., through adaptation of rotary or rotary-to-linear actuation devices. With respect to on/off valves, application in such systems would require use of a reversible stepper motor, but no positioned.

As illustrated in FIG. 4, on the housing is a rotating shaft 42 that contains magnets 24. This shaft 42 can be driven by a type of motor 12 that can be positioned and reversed to allow for control of the process fluid (e.g., Servo stepper motor). The outside rotating shaft 42 is protected inside a housing 44 that can be removed for maintenance of the driving shaft 42 without exposing the process fluid to atmosphere.

The valve system includes a motor 12 (e.g., an electrically driven motor) that can be connected to a rotating shaft 42 that contains magnets 46. A gear box system, which can include a gear reducer having a predetermined ratio, can be disposed between the rotating shaft 42 and the motor 12. The rotating shaft 42 includes an outer magnetic rotor. The outer magnetic rotor can include any suitable shape or form, such as a solid rotor, or a radial disc which is connected to a ring-shaped outer magnetic rotor ring, or any other suitable design capable of supporting magnets. In one embodiment, the outer magnets 46 can be located on the inside face of the outer rotor. The outer magnets 46 may be a plurality of evenly circumferentially spaced individual magnet elements and can be attached to the magnet rotor by being bonded, glued, or otherwise retained.

As illustrated, one or more inner magnets 48 are disposed within an alloy housing 22. The inner magnets 48 may include a magnetic arrangement, which may be a plurality of individual circumferentially spaced outward facing magnets

48 mounted to the actuation component (rotary device or rotary-to-linear device). The magnets 48 also may be mounted by being bounded, glued, or otherwise attached.

The inner magnets 48 may be sized to have a relatively close clearance gap with the inside of the alloy housing 22, and the outer magnetic rotor 42 may be sized to have a relatively close clearance with the outside of the alloy housing 22, so that a magnetic field can pass through the alloy housing 22 and so that rotation of the outer magnetic rotor 42 causes rotation of the actuation component to provide a magnetic drive and move the valve closure element.

While certain embodiments have been described and shown in the accompanying drawings, such embodiments are merely illustrative and not restrictive of the scope of the disclosure, and this disclosure is not limited to the specific constructions and arrangements shown and described, since various other additions and modifications to, and deletions from, the described embodiments will be apparent to one of ordinary skill in the art. Thus, the scope of the disclosure is only limited by the literal language, and equivalents, of the claims which follow.

What is claimed is:

1. A valve assembly, comprising:

a valve body having a fluid passage through the valve body, the valve body comprising a seat portion;

a valve member disposed in a chamber of the valve body that is in communication with the fluid passage, the valve member being movable relative to the valve body to inhibit fluid flow in a first closed position when the valve member is in contact with the seat portion and to enable fluid flow in a second open position;

a first actuation element coupled to the valve member, the first actuation element comprising one or more magnets and configured to move the valve member in an axial direction of the valve assembly between the first closed position and the second open position;

a single-piece inner housing statically sealed to the valve body and enclosing the first actuation element, the inner housing comprising a metal alloy material, the inner housing extending continuously from a static seal with the body to surround the first actuation element on all lateral sides and an upper portion of the first actuation element opposing the valve member to define a containment system for fluid in the valve body, wherein the single-piece inner housing further extends radially inward from the static seal with the body to a location adjacent to the valve member to define the opening through which a portion of the valve member passes;

a second actuation element comprising one or more magnets, the second actuation element configured to be coupled to a valve actuator for moving the second actuation element relative to the first actuation element, the valve body, and the inner housing via magnetic force applied between the one or more magnets of the first actuation element and the one or more magnets of the second actuation element, wherein movement of the second actuation element is configured to indirectly apply a force to the first actuation element through the inner housing, and wherein the one or more magnets of the first actuation element are at least partially axially aligned with the one or more magnets of the second actuation element and laterally spaced from the one or more magnets of the second actuation element in a lateral direction of the valve assembly that is transverse to the axial direction of the valve assembly; and an outer housing directly abutting the inner housing, wherein the second actuation element is enclosed between the inner housing and the outer housing, and wherein the outer housing is configured to be removed from direct abutment with the inner housing for maintenance of the second actuation element without exposing the fluid to atmosphere.

2. The valve assembly of claim 1, wherein the second actuation element is configured to apply a magnetic force to the first actuation element through the inner housing.

3. The valve assembly of claim 2, wherein at least one of the second actuation element and the first actuation element comprises magnets.

4. The valve assembly of claim 1, wherein the inner housing physically separates the second actuation element from the first actuation element in the lateral direction of the valve assembly.

5. The valve assembly of claim 1, wherein the inner housing is coupled and sealed to the valve body on one side of the inner housing, the inner housing defining an opening into the valve body and enclosing the first actuation element and at least a portion of the valve member on remaining sides of the inner housing.

6. The valve assembly of claim 5, wherein the shaft extends through the opening in the inner housing and terminates in a plug head.

7. The valve assembly of claim 1, wherein the second actuation element is configured to apply an indirect rotational force to the first actuation element through the inner housing.

8. The valve assembly of claim 7, wherein the second actuation element is configured to apply an indirect translational force to the first actuation element through the inner housing.

9. The valve assembly of claim 1, wherein the second actuation element is configured to apply a noncontact force to the first actuation element through the inner housing.

10. The valve assembly of claim 1, wherein the first actuation element comprises a rotary-to-linear device configured to translate the valve member in response to a rotational force applied to the first actuation element by the second actuation element through the inner housing.

11. The valve assembly of claim 1, wherein the outer housing comprises a single-piece structure.

12. The valve assembly of claim 1, wherein the inner housing is statically sealed to the valve body with an O-ring.

13. A valve assembly, comprising:

a valve member on a shaft to be disposed in a chamber of a valve body that is in communication with a fluid passage through the valve body, the valve member being movable via the shaft to inhibit fluid flow through the fluid passage in a first closed position and to enable fluid flow in a second open position through the fluid passage;

an inner actuation assembly coupled to the valve member, the inner actuation assembly configured to move the valve member between the first closed position and the second open position;

a housing having an outer circumference enclosing the inner actuation assembly and configured to be statically sealed to the valve body, a lowermost portion of the housing being received within a recess in the valve body and extending continuously laterally inward from the outer circumference to define an opening configured for the shaft of the valve member to extend;

a static seal in the recess in the valve body and positioned between the lowermost portion of the housing and the valve body;

an outer actuation assembly positioned over at least a portion of the inner actuation assembly, the outer actuation assembly configured to be coupled to a valve actuator for moving the outer actuation assembly relative to the inner actuation assembly and the housing, wherein movement of the outer actuation assembly is configured to apply an indirect force to the inner actuation assembly through the housing; and an outer housing abutting a portion of the housing and positioned over the outer actuation assembly.

14. The valve assembly of claim 13, wherein the outer actuation assembly is configured to apply an indirect magnetic force to the inner actuation assembly radially through the housing in order to rotate at least a portion of the inner actuation assembly.

15. The valve assembly of claim 13, wherein an interface between the fluid passage and the housing positioned over the valve member lacks any dynamically loaded seals such that the valve assembly is operated using only the static seal to separate interior liquid flow through the fluid passage from external rotating parts of the outer actuation assembly.

16. The valve assembly of claim 13, wherein the housing encloses and radially separates the outer actuation assembly from the inner actuation assembly.

17. The valve assembly of claim 16, wherein the housing is configured to seal the inner actuation assembly between the housing and the valve body.

18. The valve assembly of claim 13, wherein the housing includes a continuous portion extending from the valve body and enclosing the inner actuation assembly on all sides except for the opening for the shaft.

19. A method of actuating a valve assembly, comprising:

disposing a valve member in a chamber of a valve body that is in communication with a fluid passage through the valve body; and moving the valve member between a first closed position to inhibit fluid flow through the fluid passage and a second close position to enable fluid flow through the fluid passage, the moving the valve member comprising:

driving an outer actuation assembly with a valve actuator; and applying an indirect force to an inner actuation assembly coupled to the valve member with the outer actuation assembly in primarily a radial direction through a housing enclosing the inner actuation assembly to the valve body, the housing extending around the inner actuation assembly and radially inward to a location adjacent to the valve member to enclose and seal the inner actuation assembly, the valve assembly lacking any sliding seals or rotating seals between the fluid passage and the housing such that the valve assembly is operated using only static seals to separate interior liquid flow through the fluid passage from external rotating parts of the outer actuation assembly.

20. The method of claim 19, further comprising:

enclosing the outer actuation assembly with an outer housing directly abutting the housing; and removing the outer housing from direct abutment with the inner housing to maintenance of the second actuation element without exposing fluid in in the valve body to atmosphere.

\* \* \* \* \*